(12) United States Patent
Oya et al.

(10) Patent No.: US 10,609,255 B2
(45) Date of Patent: Mar. 31, 2020

(54) IMAGE FORMING APPARATUS THAT RESTRICTS FUNCTIONS AFTER TERMINATION OF LOGIN PROGRAM, METHOD OF CONTROLLING THE SAME, AND STORAGE MEDIUM

(71) Applicant: CANON KABUSHIKI KAISHA, Tokyo (JP)

(72) Inventors: Hiroshi Oya, Nagareyama (JP); Yasunori Shimakawa, Komae (JP); Atsushi Ikeda, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/806,649

(22) Filed: Nov. 8, 2017

(65) Prior Publication Data
US 2018/0146117 A1 May 24, 2018

(30) Foreign Application Priority Data

Nov. 18, 2016 (JP) .................................. 2016-225380

(51) Int. Cl.
*H04N 1/00* (2006.01)
*H04N 1/44* (2006.01)
(Continued)

(52) U.S. Cl.
CPC .......... *H04N 1/4433* (2013.01); *G06F 21/32* (2013.01); *G06F 21/608* (2013.01);
(Continued)

(58) Field of Classification Search
CPC ................................................... H04N 1/0084
See application file for complete search history.

(56) References Cited

U.S. PATENT DOCUMENTS

2005/0132231 A1* 6/2005 Williamson .......... G06F 21/554
726/4
2007/0245153 A1* 10/2007 Richtsmeier ............ G06F 21/32
713/186
(Continued)

FOREIGN PATENT DOCUMENTS

CN 105450666 A 3/2016
JP 2004122778 A 4/2004
(Continued)

OTHER PUBLICATIONS

Office Action issued in Chinese Appln. No. 201711032081.3 dated Apr. 1, 2019. English translation provided.

*Primary Examiner* — Benjamin O Dulaney
(74) *Attorney, Agent, or Firm* — Rossi, Kimms, & McDowell LLP

(57) ABSTRACT

An image forming apparatus that performs authentication of a user by a login program that operates on firmware and that, upon detection an abnormality of the login program, restricts execution of a job without causing the login program to terminate, and, while execution of the job is being restricted, controls to enable reception of an operation for disabling the login program via a reception unit for receiving an operation by a user via an operation unit, and, in accordance with the operation for disabling, causes the restricted job to be executed.

29 Claims, 11 Drawing Sheets

(51) Int. Cl.
*G06F 21/32* (2013.01)
*G06F 21/60* (2013.01)
(52) U.S. Cl.
CPC ..... *H04N 1/00129* (2013.01); *H04N 1/00891* (2013.01); *H04N 1/00936* (2013.01); *H04N 1/4413* (2013.01); *H04N 2201/0094* (2013.01)

(56) References Cited

U.S. PATENT DOCUMENTS

| | | | |
|---|---|---|---|
| 2009/0174901 A1 | 7/2009 | Shigehisa et al. | |
| 2009/0271610 A1* | 10/2009 | Kotaka | H04N 1/4406 713/100 |
| 2010/0211945 A1* | 8/2010 | Doui | G06F 21/105 717/176 |
| 2010/0251341 A1* | 9/2010 | Kijima | G06F 21/31 726/4 |
| 2012/0297293 A1* | 11/2012 | Furuya | G06F 17/2264 715/239 |
| 2013/0063773 A1* | 3/2013 | Bae | G06Q 10/107 358/1.15 |
| 2013/0139249 A1* | 5/2013 | Uchikawa | G06F 21/31 726/19 |
| 2014/0074962 A1* | 3/2014 | Kano | G06F 16/9574 709/213 |
| 2017/0336741 A1* | 11/2017 | Kikegawa | G03G 15/2039 |
| 2018/0013909 A1* | 1/2018 | Yoshida | H04N 1/00891 |
| 2018/0335994 A1* | 11/2018 | Fujita | G06F 3/1297 |

FOREIGN PATENT DOCUMENTS

| | | |
|---|---|---|
| JP | 2009160847 A | 7/2009 |
| JP | 102184575 A | 9/2011 |

\* cited by examiner

IMAGE FORMING APPARATUS THAT RESTRICTS FUNCTIONS AFTER TERMINATION OF LOGIN PROGRAM, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

In recent years, image forming apparatuses that can cause an application to operate on firmware are widely used. In addition, relatively low-price image forming apparatuses have come to be able to cause an application to operate on firmware without being provided with complicated screen management processing (a window manager) relating to rendering of a screen.

For example, Japanese Patent Laid-Open No. 2004-122778 discloses a device login function that allows usage of an image forming apparatus by only an authenticated user. In the aforementioned image forming apparatuses that can cause an application to operate on firmware, a device login function is realized as one application. Hereinafter, an application provided with such a login function is referred to as a login program. By using such a device login function, it is possible to realize a restriction of the functions that can be used for each logged-in user.

SUMMARY OF THE INVENTION

An aspect of the present invention is to eliminate the above-mentioned problem with conventional technology.

A feature of the present invention is to provide a technique for achieving a state in which normal operation is possible while restricting functions that can be executed, even if an abnormality has occurred in a login program.

According to a first aspect of the present invention, there is provided an image forming apparatus for authenticating a user by a login program that operates on firmware, the apparatus comprising: a memory storing a set of instructions; and one or more processors that execute instructions of the set of the instructions and cause the image forming apparatus to function as: a reception unit configured to receive an operation by a user via an operation unit; a restriction unit configured to restrict execution of a job without causing the login program to terminate when an abnormality of the login program is detected; and a control unit configured to, while execution of the job is restricted, control to enable reception of an operation for disabling the login program via the reception unit, and, in accordance with the operation for disabling, cause the job that is restricted by the restriction unit to be executed.

According to a second aspect of the present invention, there is provided an image forming apparatus having a reception unit configured to receive an operation by a user, and operable to cause an application program to operate on firmware, wherein the firmware detects an abnormality of the application program that operates on the firmware, and, when the application program for which the abnormality was detected is a login program, restricts execution of a job without causing the login program to terminate, and while execution of the job is restricted, the firmware enables reception of an operation for disabling the login program via the reception unit, and causes the job to be executed in accordance with the operation for disabling.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that, in the present embodiment, explanation is given by taking a multi-function peripheral (MFP) as an example of an embodiment for an image forming apparatus of the present invention, but the present invention is not limited to an MFP.

Typically, if an abnormality occurs in a login program, the login program is forcibly terminated, but restriction of functions that were being performed by the login program ceases to work at this point, and all users end up being able to use all menus. These menus include an administrator menu for example, and this administrator menu includes settings that only an administrator should access (for example, security settings or the like). Accordingly, in the present embodiment, explanation is given for an example of not allowing a situation in which all users can use all menus occur due to the forced termination of a login program.

Figure 1:
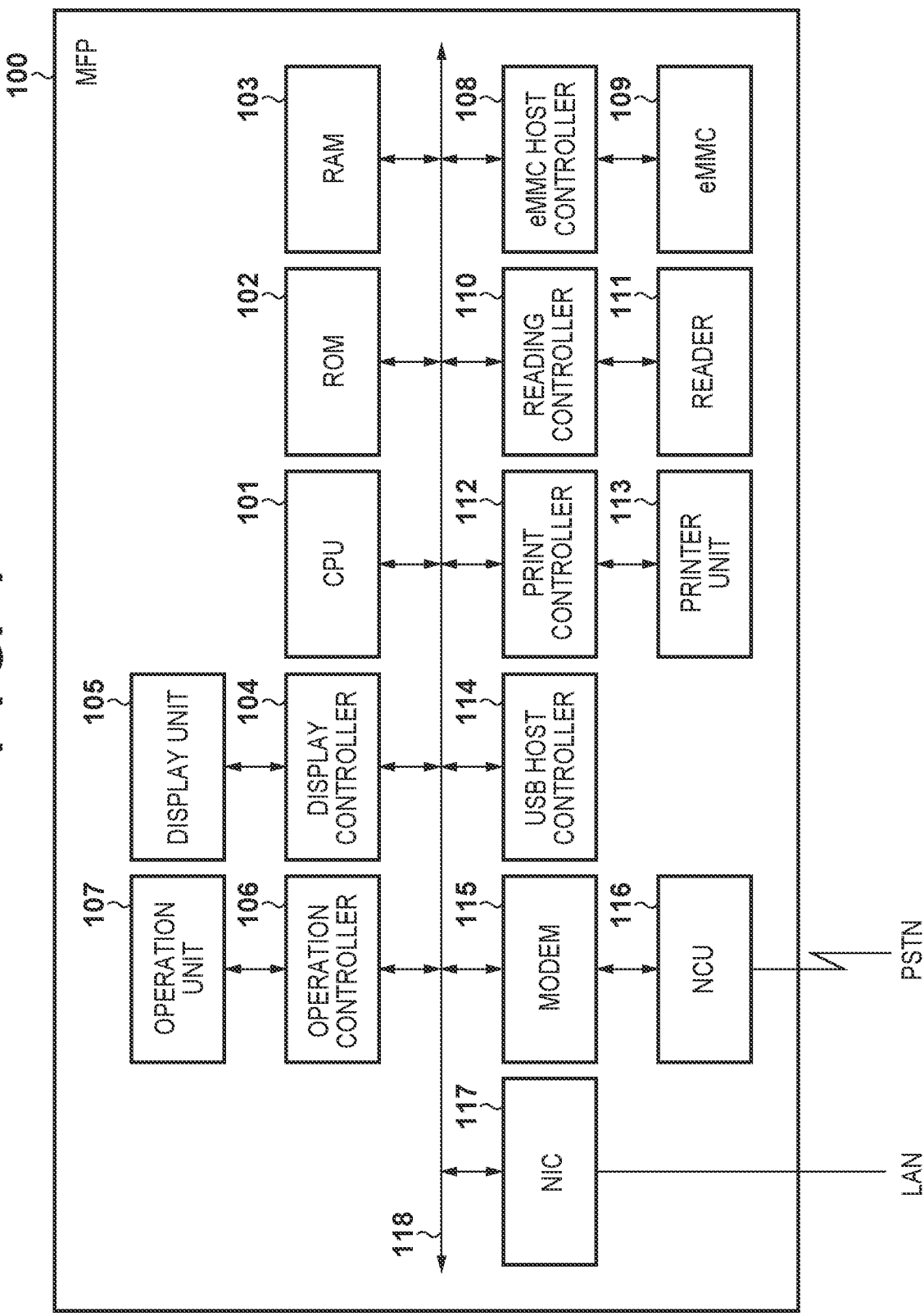
FIG. 1 is a block diagram for explaining a hardware configuration of an MFP according to an embodiment of the present invention.

FIG. 1 is a block diagram for explaining a hardware configuration of an MFP 100 according to the embodiment of the present invention.

The MFP 100 is provided with a CPU 101, a ROM 102, a RAM 103, a display controller 104, display unit 105, an operation controller 106, and an operation unit 107. The MFP 100 is also provided with an eMMC (Embedded Multi Media Card) host controller 108, an eMMC 109, a read controller 110, a reader 111, a print controller 112, and a printer unit 113. The MFP 100 is further provided with a USB host controller 114, a modem 115, a network control unit (NCU) 116, and a network interface card (NIC) 117.

The CPU 101 performs overall control of each device connected to a system bus 118. The CPU 101 executes a boot program stored in the ROM 102 when a power supply is supplied. Normally the boot program deploys a main program saved in a storage (for example, the eMMC 109) to the RAM 103, and jumps to the beginning of the deployed main program. The RAM 103 functions as, for example, a work area of the main program, as well as a load location of the main program. The CPU 101 executes control that is described later with reference to flowcharts, and executes various processing according to the present embodiment.

The display controller 104 controls rendering to the display unit 105. The display unit 105 is a WVGA-size full-bitmap display unit. The operation controller 106 controls input from the operation unit 107. The operation unit 107 includes a touch panel that is overlapped with the display unit 105, various hard keys, or the like. The reader 111 performs reading of an original. An automatic document feeder (not shown) is mounted to the reader 111 as an option, and it is possible to automatically feed and read a plurality of originals. The reader 111 is connected to the reading controller 110, and the CPU 101 exchanges information with the reader 111 via the reading controller 110.

The printer unit 113 forms (prints) an image on print paper (a sheet), for example by an electrophotographic method. The printer unit 113 is connected to the print controller 112, and the CPU 101 exchanges information with the printer unit 113 via the print controller 112. The USB host controller 114 handles USB protocol control and mediates access to a USB device such as a USB memory (not shown). The modem 115 performs a modulation/demodulation of signals necessary for a facsimile communication. The modem 115 is connected to the NCU 116. A signal modulated by the modem 115 is outputted to a telephone public circuit network (PSTN) via the NCU 116. The NIC 117 bidirectionally exchanges, via the LAN, email, a file, or the like with a server or the like.

The MFP 100 according to the embodiment is provided with the eMMC 109 as storage. The CPU 101 reads and writes data by accessing the eMMC 109 via the eMMC host controller 108.

Figure 2:
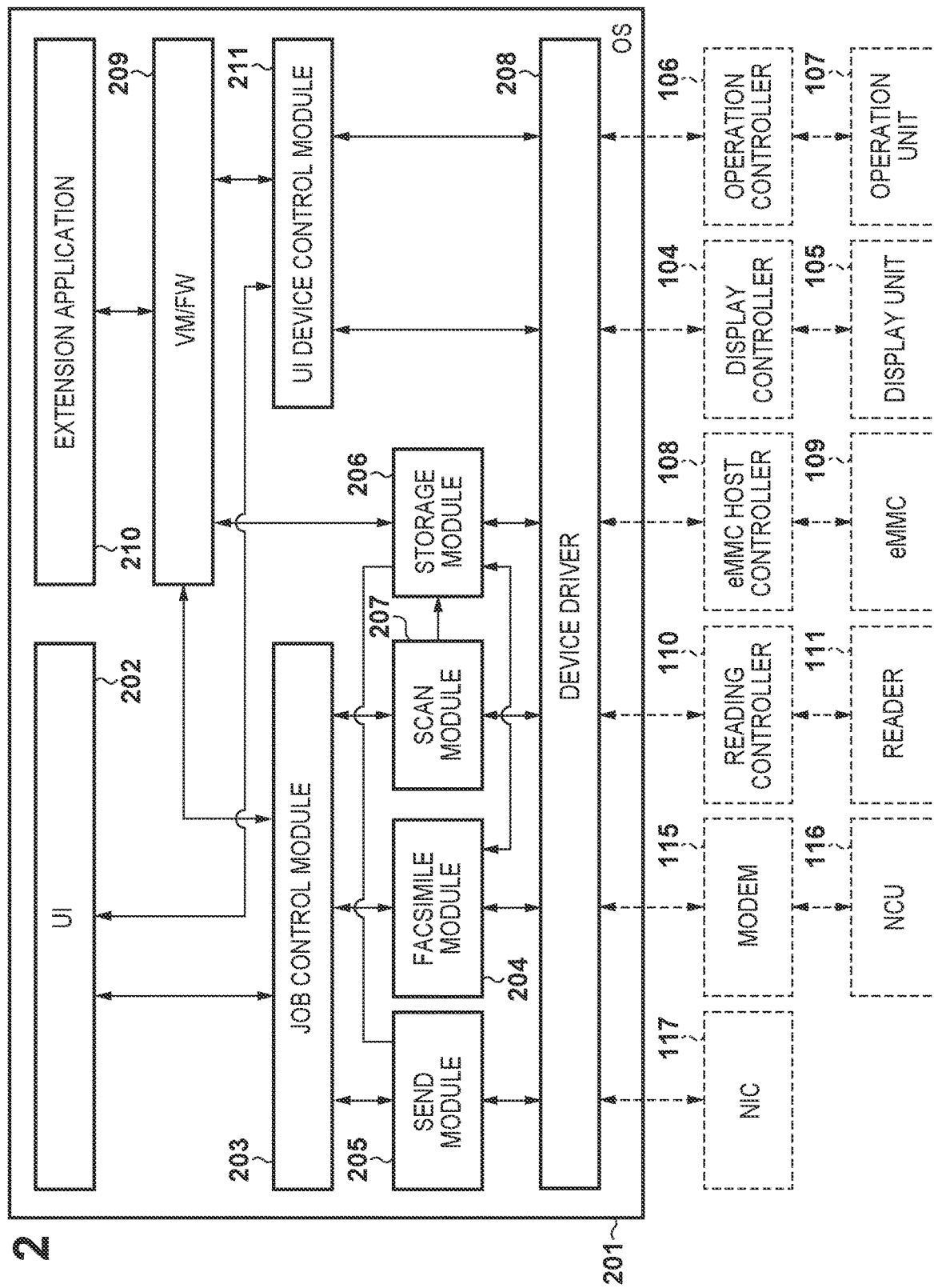
FIG. 2 is a block diagram for explaining a software configuration of the MFP according to the embodiment.

FIG. 2 is a block diagram for explaining a software configuration of the MFP 100 according to the embodiment. Note that each unit illustrated by solid lines in FIG. 2 is a software module that is realized by the CPU 101 executing a program deployed to the RAM 103 by the boot program previously described. In addition, portions common with FIG. 1 are indicated by the same reference numeral in FIG. 2.

Execution of each later-described module of the main program is managed/controlled by an OS (operating system) 201. A device driver 208 is combined with the OS 201. The device driver 208 mediates exchanges with hardware devices such as the display controller 104, the operation controller 106, and the reading controller 110.

A UI (user interface) 202 provides various pieces of information to a user via the display unit 105 and the operation unit 107, and also receives various instructions from a user. A job control module 203 receives a job such as for copying, printing, or faxing, and controls execution of a received job. A storage module 206 is a software module for physically storing data such as a user setting or an image received or to be sent by facsimile, for example, in the eMMC 109, and managing this data. For example, when the job control module 203 receives a FAX job in the MFP 100 according to the present embodiment, a scan module 207 receives the job and controls the reader 111 to read an original. Image data created by reading the original is stored by the storage module 206. The image data stored by the storage module 206 is read by a facsimile module 204, and transmitted by fax to a counterparty via the modem 115 and the ICU 116. Image data received by fax from a counterparty via the modem 115 and the NCU 116 is read by the facsimile module 204, and stored by the storage module 206. In addition, a send module 205 sends, by a file transfer protocol, image data stored by the storage module 206, and stores received image data by the storage module 206.

The MFP 100 according to the present embodiment is provided with a VM (Virtual Machine)/FW (Framework) 209 that can cause an application program (an extension application) to operate on the firmware. Note that the VM/FW 209 is a part of the firmware. An extension application 210 is for example a program defined by a scripting language, and configuration may be taken to use a language system such as Lua or Java (registered trademark) which is an interpreter for interpreting and executing bytecode. The VM/FW 209 installs, as the extension application 210, a program defined in a scripting language or a predetermined high-level language. It also handles a role of uninstalling the extension application 210. In addition, the VM/FW 209 handles arbitration or the like between a function realized by a program installed as the extension application 210, and an existing function. The VM/FW 209 interprets and executes a program written in a scripting language. In addition, the VM/FW 209 sends a message to the extension application 210 when an event that is associated with the program installed as the extension application 210 has occurred. Here, the event may be, for example, a key input detected by the UI 202, expiration of a timer managed by the VM/FW 209, or the like. In a case where an abnormality is detected in the program installed as the extension application 210 such as when there is no response with respect to a message sent to the extension application 210, the VM/FW 209 forcibly terminates this program.

In this way, the MFP 100 according to the embodiment can easily realize a function such as a login application or a slideshow, while maintaining the attachability/detachability of the function.

A UI device control module 211 outputs, to the display unit 105, various information from the extension application 210 and the UI 202, and mediates transmission to the extension application 210 and the UI 202, which perform control based on a user operation on the operation unit 107. Details are explained later.

Figure 8:
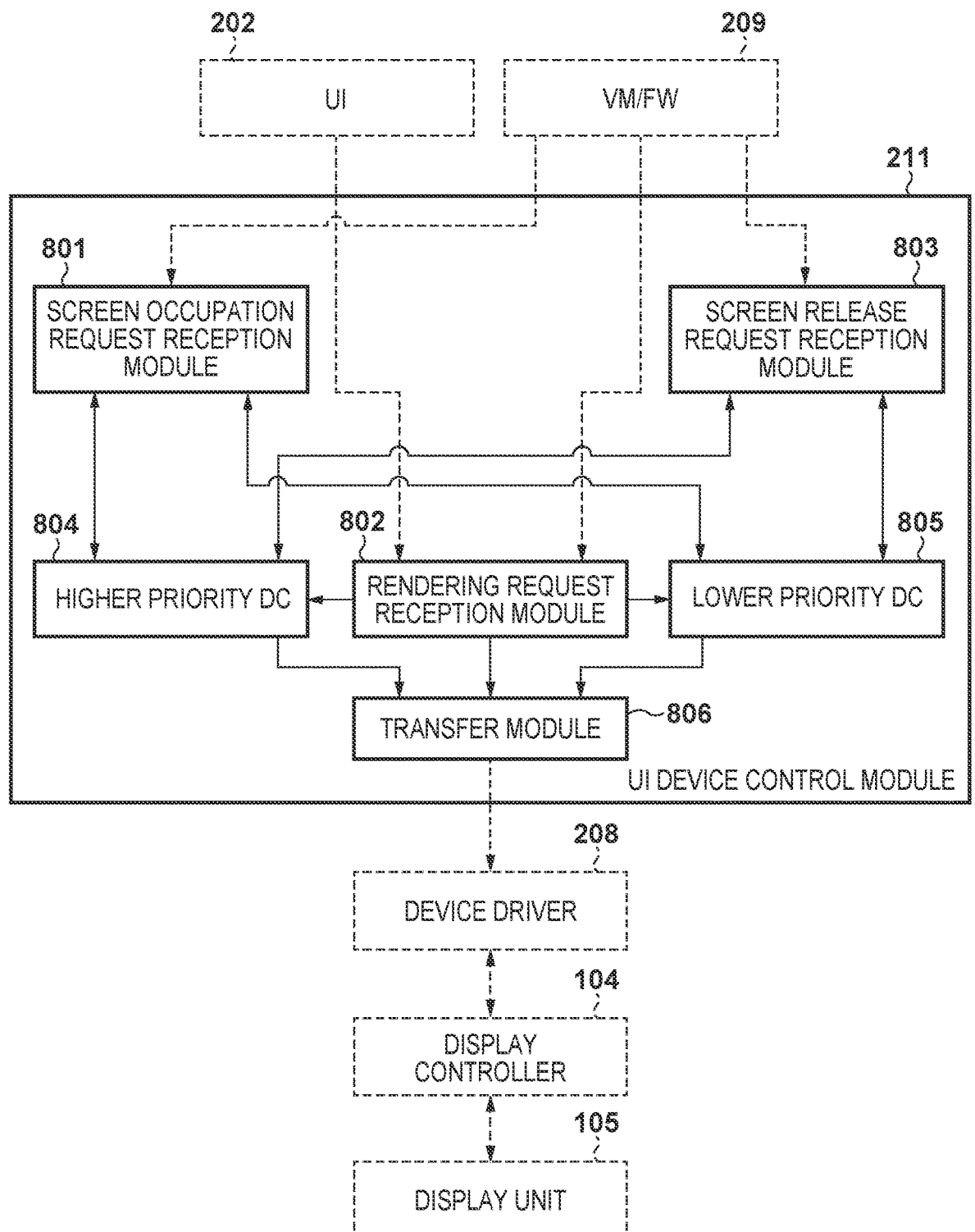
FIG. 8 is a software configuration diagram for explaining details of modules associated with display in a UI device control module according to the embodiment.

FIG. 8 is a software configuration diagram for explaining details of modules associated with display in the UI device control module 211 according to the embodiment. Note that, portions in common with FIG. 2 are indicated by the same reference numerals in FIG. 8.

The UI device control module 211 is provided with a screen occupation request reception module 801, a rendering request reception module 802, and a screen release request reception module 803. In addition, the UI device control module 211 is provided with a higher priority display context (DC) 804, a lower priority DC 805, and a transfer module 806. The higher priority DC 804 and the lower priority DC 805 are allocated in the RAM 103, and are configured so that it is possible to hold an occupation state and virtual video RAM (VRAM) that models the display unit 105.

The screen occupation request reception module 801 receives a screen occupation request from the extension application 210 that is sent via the VM/FW 209, and allocates the higher priority DC 804 or the lower priority DC 805 in accordance with the request source. Conversely, the screen release request reception module 803 receives a screen release request from the extension application 210 that is sent via the VM/FW 209, and releases the allocated DC.

The rendering request reception module 802 receives a request for screen rendering from the extension application 210 that is sent via the VM/FW 209, or for screen rendering by the UI 202. In accordance with a screen occupation state, the DC is rendered in the VRAM, or details of the VRAM or rendering by the UI 202 is transferred to the display unit 105 via the transfer module 806, the device driver 208, and the display controller 104 in this order. Details of each of these is described later.

Figure 3:
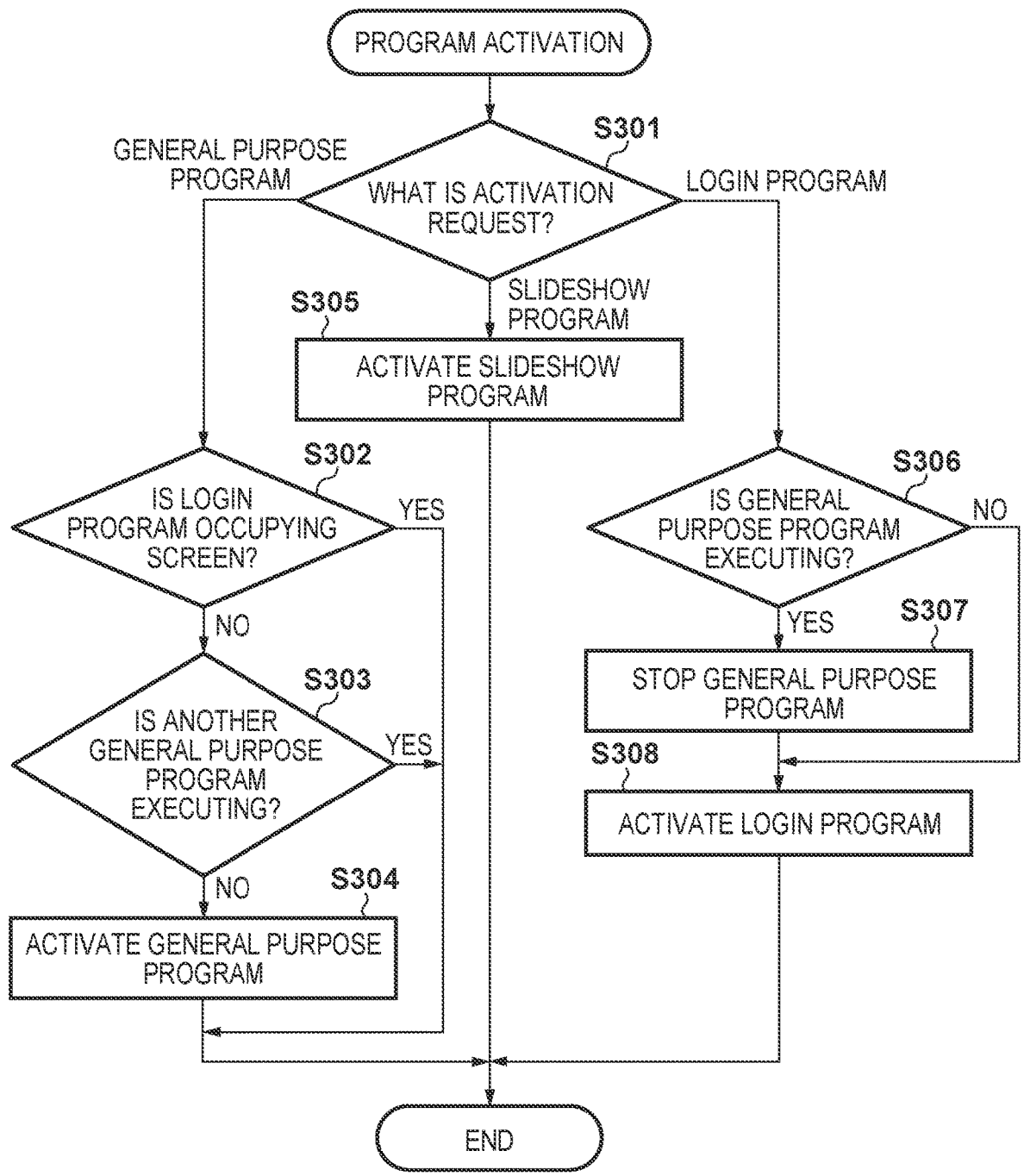
FIG. 3 is a flowchart for describing processing for activating a program by an extension application, in the MFP according to the embodiment.

FIG. 3 is a flowchart for describing processing for activating a program by the extension application 210, in the MFP 100 according to the embodiment. Program activation processing that is described in FIG. 3 is a portion of processing that configures the VM/FW 209 of FIG. 2. Because this processing is realized by the CPU 101 executing a program deployed to the RAM 103 by the boot program previously described, an agent of processing is explained here as the CPU 101 which executes the extension application 210.

In the MFP 100 according to the embodiment, the extension application 210 comprises one out of three types of programs or all of these types of programs. One of these types of programs is a login program. Activation of the login program is requested upon power on of the MFP 100 or the login program being installed and being enabled, and the login program prompts for authentication of a user when they use the MFP 100. Once the login program is activated, it continues to operate as long as the user does not disable it. Another of the three types of programs is a slideshow program. Activation of the slideshow program is requested when a button displayed on the display unit 105 is selected, or when no operation has been made after a predetermined amount of time, which is set in advance, has passed while a program of the same type is in an inactivated state. The slideshow program is, for example, a program for displaying a screensaver that prevents a screen from being burnt-in. When a user operates the operation unit 107 while the slideshow program is operating, the slideshow program will be caused to terminate by the VM/FW 209. The last of the three types of programs is a general purpose program. Activation of the general purpose program is requested when a function button displayed on the display unit 105 is selected. In addition, the general purpose program is implemented so as to promptly terminate when predetermined processing completes.

Firstly, in step S301, the CPU 101 determines what type of program the activation request is for. If it is a request for a general purpose program the processing proceeds to step S302, if it is a request for a slideshow program the processing proceeds to step S305, and if it is a request for a login program the processing proceeds to step S306.

If the activation request is for the general purpose program, in step S302 the CPU 101 determines whether or not a login program has called the screen occupation request reception module 801 and is occupying the screen. If the screen is not being occupied by the login program, the processing proceeds to step S303, and if the screen is being occupied, the request is ignored and the processing to activate the program terminates. In step S303, the CPU 101 determines whether or not another general purpose program is being executed. If no another general purpose program is being executed, the processing proceeds to step S304, and the CPU 101 activates the general purpose program requested in step S301, and this processing terminates. If another general purpose program is being executed in step S303, the processing terminates.

In addition, if the activation request is for the slideshow program, the processing proceeds from step S301 to step S305, the CPU 101 activates the requested slideshow program, and this processing terminates.

In addition, if the activation request is for the login program the processing proceeds from step S301 to step S306, and the CPU 101 determines whether or not a general purpose program is being executed. Here, if the general purpose program is being executed, the processing proceeds to step S307, and if not, the processing proceeds to step S308. In step S307, the CPU 101 forcibly stops the general purpose program that is being executed, and the processing proceeds to step S308. In step S308, the CPU 101 activates the requested login program, and this processing terminates. In this way, the activated login program promptly occupies the screen.

As explained above, in the MFP 100 according to the embodiment, general purpose programs are controlled so that only one operates. In addition, upon activation of the general purpose program, if a login program is occupying the screen, control is performed so that the general purpose program does not activate. Furthermore, when activation of a login program is instructed when a general purpose program is being executed, the general purpose program that is being executed is forcibly stopped, and only the login program is activated.

Figure 4:
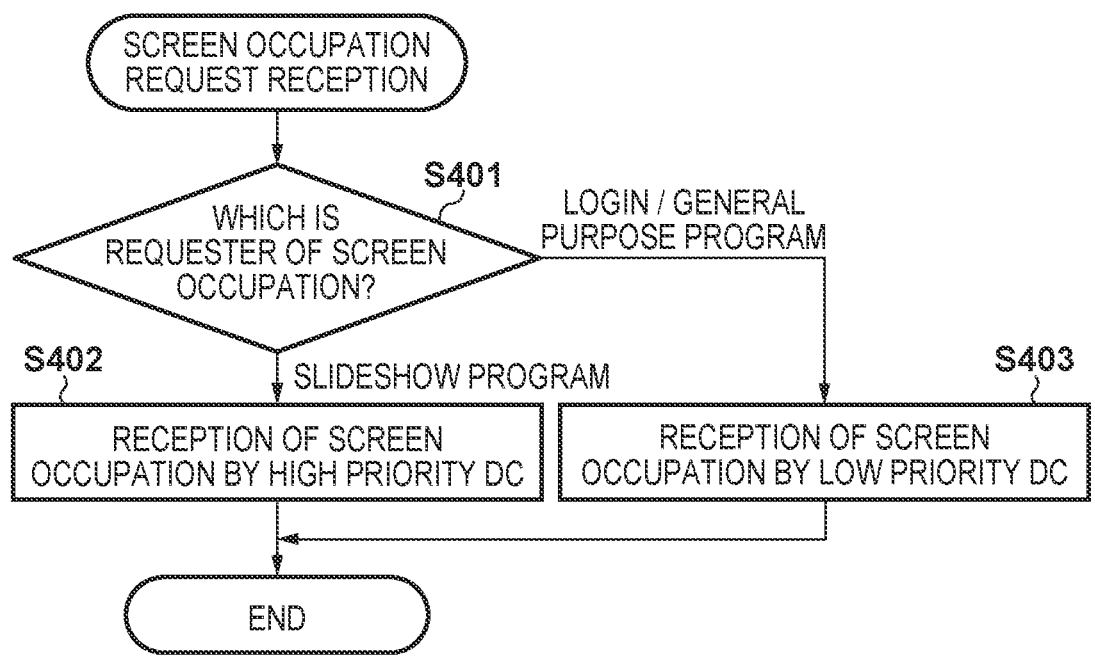
FIG. 4 is a flowchart for describing operation of a screen occupation request reception module in the MFP according to the embodiment.

FIG. 4 is a flowchart for describing operation of the screen occupation request reception module 801 in the MFP 100 according to the embodiment. Because this processing is realized by the CPU 101 executing a program deployed to the RAM 103 by the boot program previously described, an agent of processing is explained here as the CPU 101 which functions as the screen occupation request reception module 801.

This processing is started by an arbitrary application program of the extension application 210 requesting occupation of the screen via the VM/FW 209.

Firstly, in step S401, the CPU 101 determines the type of the program that is a request source for screen occupation. Here, if it is determined that the request source program is a slideshow program (screensaver), the processing proceeds to step S402, and otherwise, in other words, if the request source program is determined to be a login program or a general purpose program, the processing proceeds to step S403. In the case of a slideshow program, in step S402 the CPU 101 receives screen occupation in accordance with the higher priority DC 804. An identifier for identifying the higher priority DC 804 for which screen occupation has been permitted is returned, via the VM/FW 209, to the slideshow program of the extension application 210 that requested screen occupation, and this processing terminates.

Meanwhile, in the case of the login program or the general purpose program, in step S403, the CPU 101 receives screen occupation in accordance with the lower priority DC 805. An identifier for identifying the lower priority DC 805 for which screen occupation has been permitted is returned, via the VM/FW 209, to the login program or the general purpose program of the extension application 210 that requested screen occupation, and this processing terminates.

By this processing, an identifier for the higher priority DC 804 which has the highest priority is added to the slideshow program that functions as a screensaver, and an identifier for the lower priority DC 805 which has a low priority is added to the login program or the general purpose program.

Figure 5:
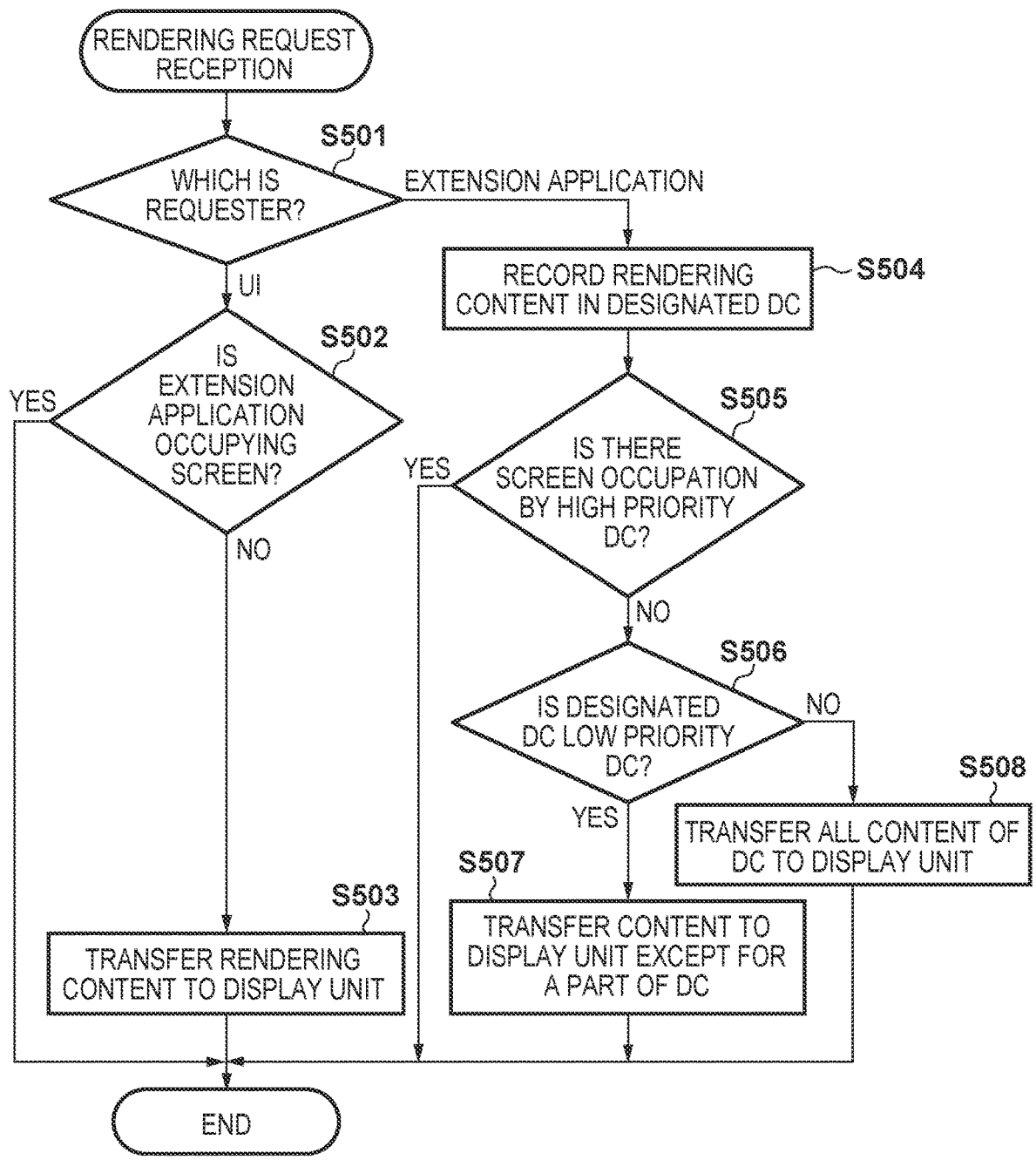
FIG. 5 is a flowchart for describing operation of a rendering request reception module in the MFP according to the embodiment.

FIG. 5 is a flowchart for describing operation of the rendering request reception module 802 in the MFP 100 according to the embodiment. Because this processing is realized by the CPU 101 executing a program deployed to the RAM 103 by the boot program previously described, an agent of processing is explained here as the CPU 101 which functions as the rendering request reception module 802.

This processing is started by the UI 202 or an arbitrary application program of the extension application 210 requesting rendering of the screen via the VM/FW 209.

Firstly, in step S501, the CPU 101 determines which module is an issuing source of the rendering request. If the request source for rendering is the UI 202, the processing proceeds to step S502, and if it is a program of the extension application 210, the processing proceeds to step S504. In step S502, the CPU 101 determines whether or not a program of the extension application 210 is occupying the screen. If it is determined that the screen is being occupied by the program of the extension application 210, the rendering request by the UI 202 is ignored, and this processing terminates. Meanwhile, if it is determined that the screen is not being occupied by the program of the extension application 210, the processing proceeds to step S503, the transfer module 806 is requested to transfer the details of rendering by the UI 202 to the display unit 105, and this processing terminates.

By this, a rendering request from the UI is only received when the screen is not being occupied by a program of the extension application 210, and then a display therefor is performed.

In step S504, the CPU 101 records the rendering content in the VRAM of the DC designated by the program of the extension application 210. Next, the processing proceeds to step S505, and the CPU 101 determines whether or not the screen is being occupied by a DC having a higher priority than the designated DC. If the screen is not being occupied by a DC having a higher priority the processing proceeds to step S506, and if the screen is being occupied by the DC having a higher priority, in other words if the screen is being occupied by the slideshow program, then this processing terminates without anything being displayed.

In step S506, the CPU 101 determines whether or not the DC designated by the program of the extension application 210 is the lower priority DC. Here, if it is determined to be the lower priority DC, the processing proceeds to step S507, and if it is determined to be the higher priority DC, the processing proceeds to step S508. In step S507, the CPU 101 makes a request to the transfer module 806 to transfer content, excluding a part of the VRAM for the lower priority DC 805, to the display unit 105, and this processing terminates. Meanwhile, in the case of the higher priority DC, the processing proceeds to step S508 and the CPU 101 makes a request to the transfer module 806 to transfer all the content of the VRAM for the higher priority DC 804 to the display unit 105, and this processing terminates.

Figure 9:
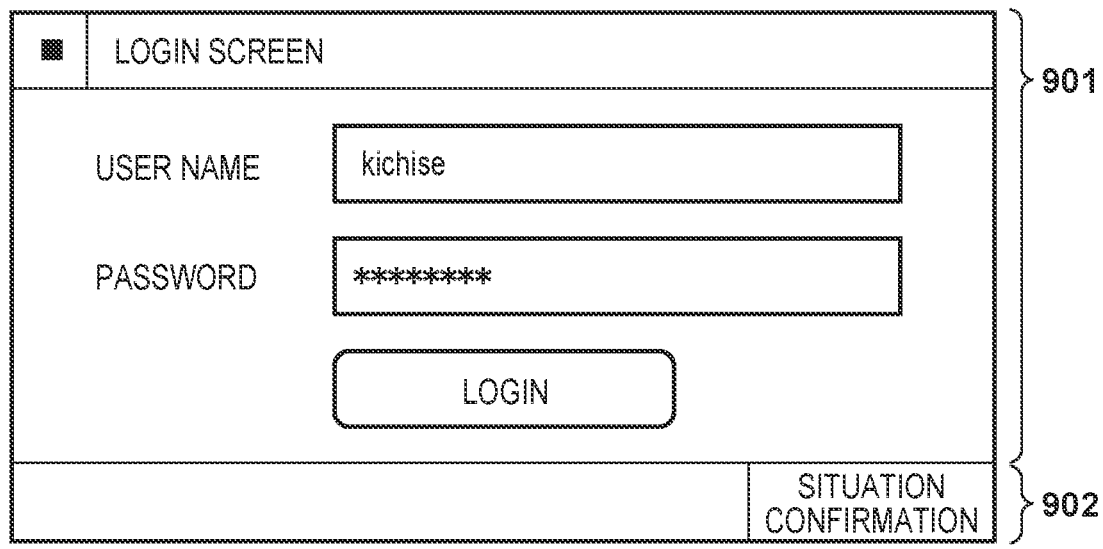
FIG. 9 depicts a view for illustrating an example of a login screen that is transferred in step S507 of FIG. 5.

FIG. 9 depicts a view for illustrating an example of a login screen that is transferred in step S507 of FIG. 5. FIG. 9 illustrates a case in which there is a rendering request from a login program of the extension application 210 when the screen is being occupied by the UI 202, for example.

Here, the login screen is displayed in accordance with the rendering request by the login program of the extension application 210. A region 901 is a region that is transferred to the display unit 105 in step S507, and a region 902 is a region in which content rendered by the UI 202 is displayed.

As explained above, if the rendering request source is the UI, rendering content by the UI is displayed on the display unit 105 only when a program of the extension application 210 is not occupying the screen.

Meanwhile, at the time of a rendering request from a program of the extension application 210, the rendering request is not received if the screen is being occupied by the slideshow program (higher priority). Meanwhile, when the screen is being occupied by a lower priority DC such as the login program, a general purpose program, or a UI, if the DC designated by a program of the extension application 210 is the lower priority DC, content is displayed on the display unit except for a portion of the VRAM of the lower priority DC. Meanwhile, in step S506, if the designated DC is the higher priority DC, the higher priority DC of the program that made the rendering request (here, the screensaver) is displayed in place of the display content displayed so far.

Figure 6:
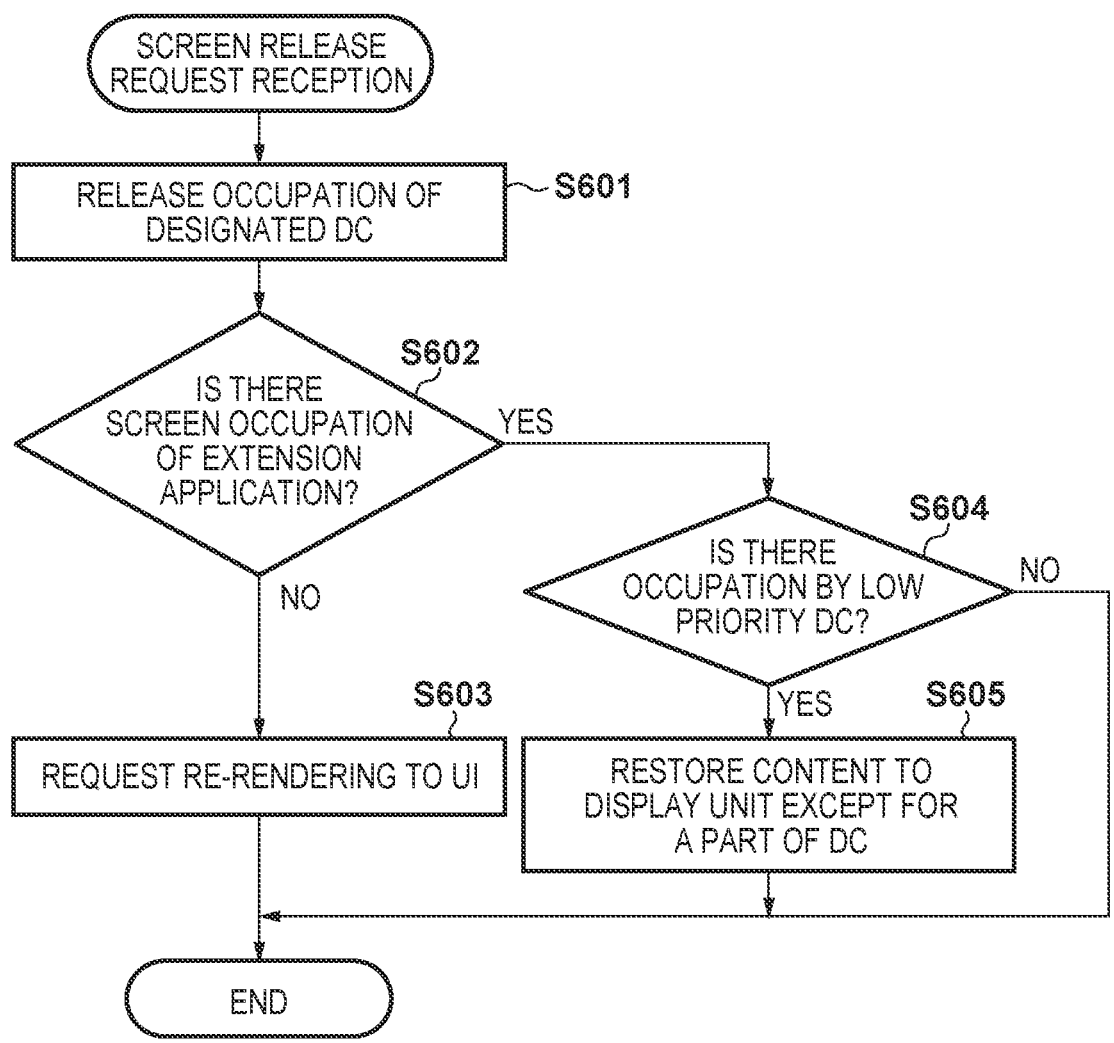
FIG. 6 is a flowchart for describing operation of a screen release request reception module in the MFP according to the embodiment.

FIG. 6 is a flowchart for describing operation of the screen release request reception module 803 in the MFP 100 according to the embodiment. Because this processing is realized by the CPU 101 executing a program deployed to the RAM 103 by the boot program previously described, an agent of processing is explained here as the CPU 101 which functions as the screen release request reception module 803.

This processing is started by an arbitrary application program of the extension application 210 requesting for the release of the screen via the VM/FW 209.

Firstly, in step S601, the CPU 101 releases occupation of the DC designated by a program of the extension application 210. Next, the processing proceeds to step S602, and the CPU 101 determines whether or not a program of the extension application 210 is occupying the screen. Upon determining here that there is no occupation of the screen, the processing proceeds to step S603. In step S603, the CPU 101 requests the UI 202 for re-rendering, and this processing terminates.

Meanwhile, when it is determined in step S602 that there is occupation of the screen by the program of the extension application 210, the processing proceeds to step S604. In step S604, the CPU 101 determines whether or not the screen is being occupied by a DC having a lower priority than the released DC. When it is determined here that there is no occupation of the screen by a DC of a lower priority, this processing terminates. Meanwhile, if the CPU 101 determined in step S604 that there is occupation of the screen by the DC of a lower priority than the released DC, the processing proceeds to step S605. In step S605, the CPU 101 requests the transfer module 806 so as to transfer content excluding a part of the VRAM for the lower priority DC 805 that has a lower priority than the released DC to the display unit 105, and this processing terminates.

By this processing, for example when the slideshow program having a higher priority has released occupation of the screen, if the login program having a lower priority is occupying the screen, details of the screen rendered by the login program is restored to the display unit 105.

Figure 7:
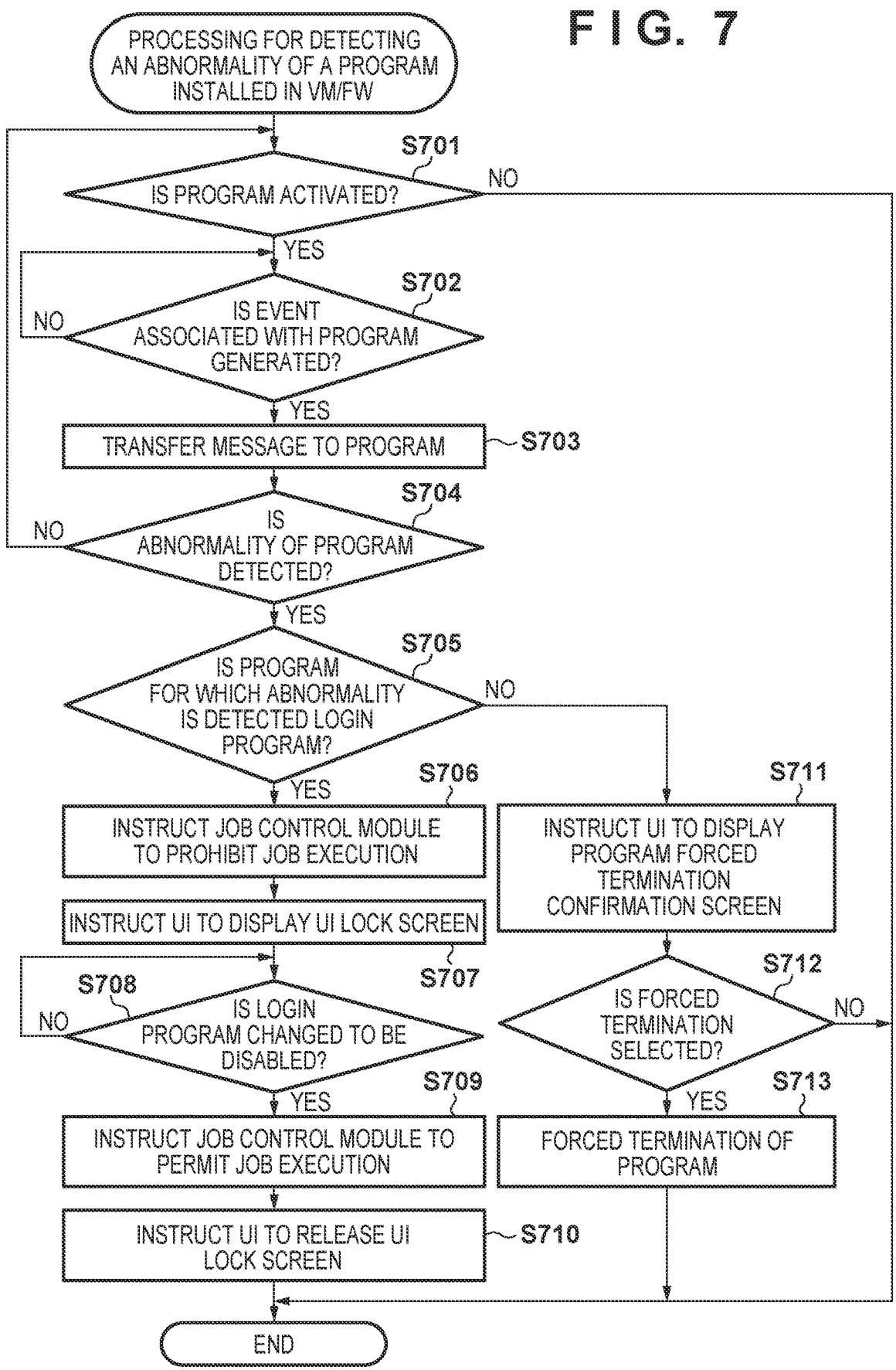
FIG. 7 is a flowchart for describing processing for detecting an abnormality of a program installed in the extension application, in accordance with a VM/FW of the MFP according to the embodiment.

FIG. 7 is a flowchart for describing abnormality detection processing for a program installed in the extension application 210, in accordance with the VM/FW 209 of the MFP 100 according to the embodiment. Because this processing is realized by the CPU 101 executing a program deployed to the RAM 103 by the boot program previously described, an agent of processing is explained here as the CPU 101.

The abnormality detection processing is processing for the CPU 101, functioning as the VM/FW 209, to detect an abnormality by monitoring for an abnormality of an arbitrary program of the extension application 210. Note that, although explanation has been given in this embodiment by taking as an example a case in which there is no response to a message sent by the VM/FW 209 as a trigger for abnormality detection, but a trigger for abnormality detection is not limited to this example.

Firstly, in step S701, the CPU 101 determines whether or not there is a program that has been activated by the extension application 210. If an activated program is not present, processing for detecting an abnormality is unnecessary, and thus this processing terminates. If the CPU 101 determines in step S701 that there is an activated program, the processing proceeds to step S702. In step S702, the CPU 101 monitors for the generation of an event associated with the activated program, and if the generation of an event associated with the activated program is not detected, the processing stays at step S702 and continues to monitor for the generation of such an event. In this way, when the CPU 101 detects in step S702 the generation of an event associated with the activated program, the processing proceeds to step S703.

In step S703, the CPU 101 sends a message for notifying the detection of a generated event to the extension application 210. At this point, when the message is sent, the CPU 101 sets a predetermined amount of time to a timer for monitoring a timeout of a response with respect to the message. In step S704, if the CPU 101 receives a response to the message within the predetermined amount of time and an abnormality is not detected the processing returns to step S701, but if the CPU 101 determines that an abnormality is detected by there being no response within the predetermined amount of time, the processing proceeds to step S705.

In step S705, the CPU 101 determines whether or not the program for which the abnormality is detected is the login program. Here, configuration is taken to generate a dedicated thread for managing a program when the program is activated, and communication with the program is performed by this thread. With such a configuration, it is possible to uniquely identify a program for which the abnormality has occurred, in accordance with which thread the abnormality is detected in. Note that, in the present embodiment, explanation is given of an example in which a determination as to whether or not a program for which an abnormality is detected is the login program in accordance with generating dedicated threads is made, but another method may be used. For example, configuration may be taken so as to add an identification ID for identifying a program when the program is activated, and have the VM/FW 209 determine, from the identification ID of a program for which the abnormality is detected, whether or not the program is the login program.

When the CPU 101 determines in step S705 that the program for which the abnormality is detected is the login program, the processing proceeds to step S706. In step S706, the CPU 101 performs an instruction to the job control module 203 so as to prohibit execution of jobs. The job control module 203, upon receiving this instruction, performs control so that no job is executed. Next, the processing proceeds to step S707, the CPU 101 makes an instruction, via the UI device control module 211, to the UI 202 for displaying a UI lock screen, and the processing proceeds to step S708.

Figure 11A:
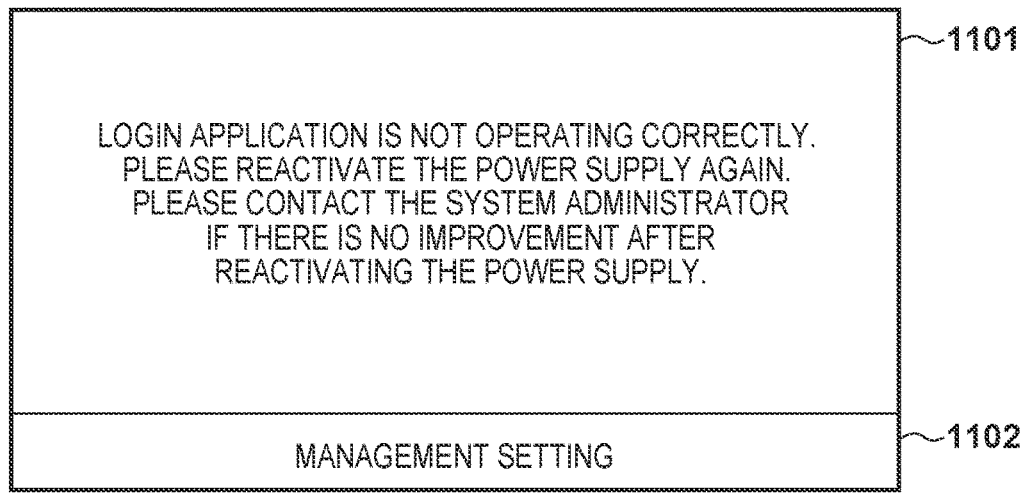
FIGS. 11A through 11C depict views for illustrating examples of screens of a UI lock screen according to the embodiment.
Figure 11B:
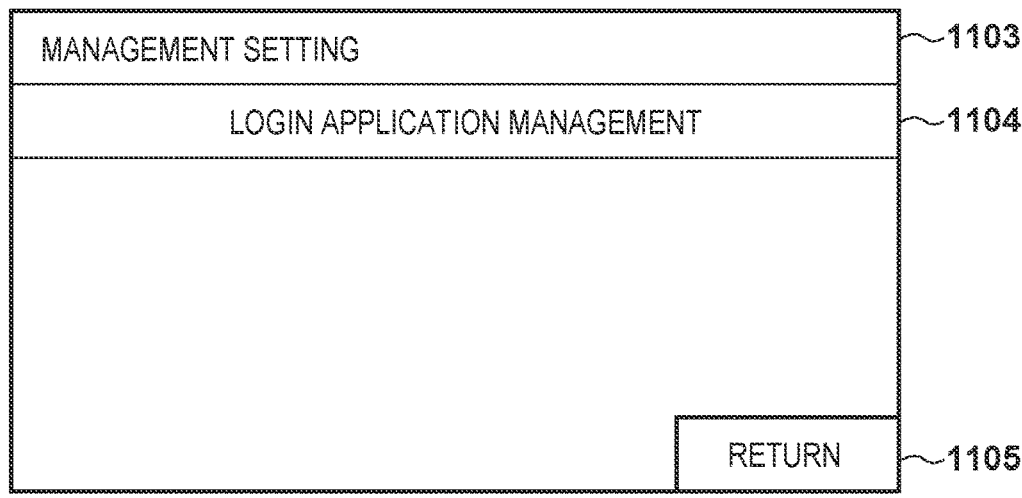
Figure 11C:
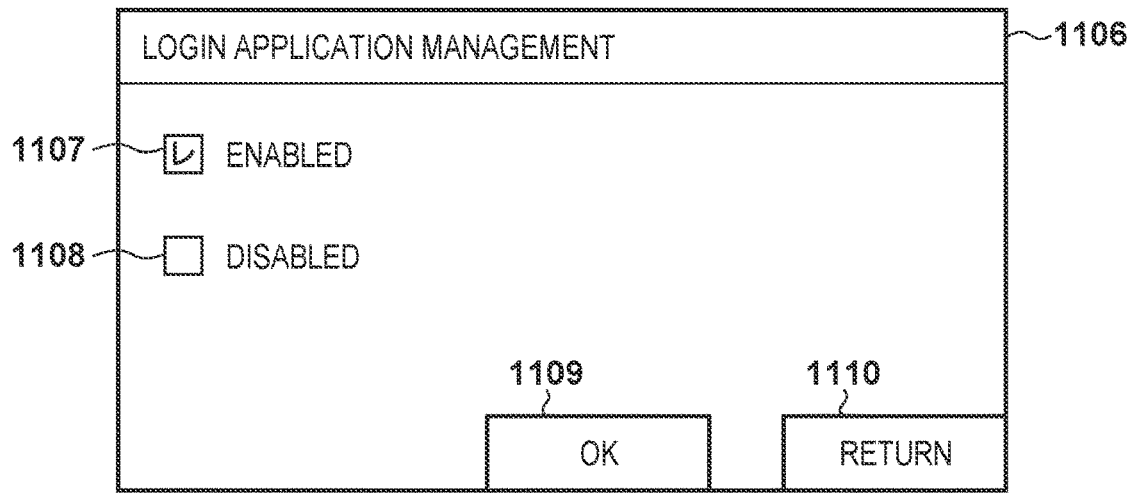

FIGS. 11A through 11C depict views for illustrating examples of screens of the UI lock screen according to the embodiment.

In a screen 1101 of FIG. 11A, because the login program is not correctly operating, a message prompting for a re-activation of the power supply, in other words, turning the device off and on, is displayed, and normal operations such as copying are made to be unexecutable. In addition, when a "management setting" menu button 1102 of FIG. 11A is selected, a transition is made to a system administrator authority authentication screen (not shown), and when a password is inputted in the screen, a screen 1103 of FIG. 11B is displayed. Here, system administrator authority authentication is executed not by the login program but by a function held by the MFP 100. A "login application management" menu button 1104 and a "return" button 1105 are displayed on the screen 1103. Here, when a user selects the "login application management" menu button 1104, a screen 1106 of FIG. 11C is further displayed. When the "return" button 1105 is selected, a transition is made to the screen 1101 of FIG. 11A.

When a "enable" check box 1107 of the screen 1106 of FIG. 11C is removed, a check input to a "disable" check box 1108, and an OK button 1109 selected, it is possible to disable functions of the login program.

In this way, by making it so that a system administrator can disable the login program function when an abnormality of the login program is detected, it is possible to use a function of the MFP 100 again with the permission of the system administrator. Specifically, when a change is made to disable the login program, the VM/FW 209 instructs the UI 202 to release a UI lock screen, and instructs the job control module 203 to permit the execution of jobs. Here, when the "return" button 1110 is selected in FIG. 11C, a transition is made to the screen 1103 of FIG. 11B.

In the present embodiment, the MFP 100 has a the system administrator authority authentication function, and is configured so that a system administrator can change a login program to disabled. However, if the MFP 100 does not have an authentication function, configuration may be taken so as to display only the screen 1101 of FIG. 11A, and not display the "management setting" menu button 1102.

In step S708, the CPU 101 determines whether or not the login program has been changed to disabled by the screen 1106 of FIG. 11C, on the basis of input by a user in the management screen, for example. If the CPU 101 determines in step S708 that the login program has been changed to disabled, the processing proceeds to step S709. In step S709, the CPU 101 performs an instruction to the job control module 203 so as to permit execution of jobs, and the processing proceeds to step S710. The job control module 203, upon receiving this instruction, releases prohibition of all jobs. In step S710, the CPU 101 performs, via the UI device control module 211, an instruction for release of the UI lock screen on the UI 202, and the processing terminates.

Meanwhile, when it is determined in step S705 that the program for which the abnormality was detected is not the login program, the processing proceeds to step S711. In step S711, the CPU 101 performs, via the UI device control module 211, an instruction for display of a program forced termination confirmation screen on the UI 202, and the processing proceeds to step S712. Accordingly, a screen for confirming whether or not to forcibly terminate the program, as illustrated by FIG. 12 for example, is displayed on the display unit 105.

Figure 12:
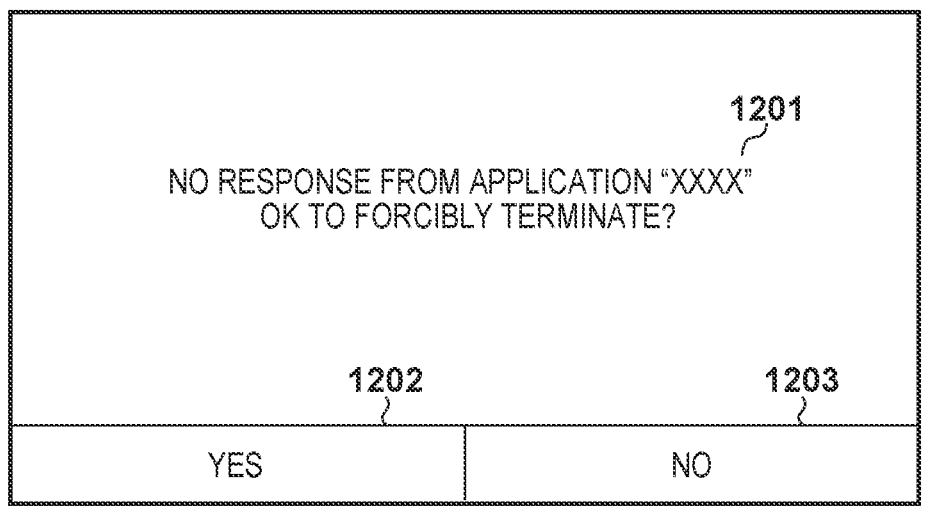
FIG. 12 depicts a view for illustrating an example of a confirmation screen for forced termination of a program, according to the embodiment.

FIG. 12 depicts a view for illustrating an example of a program forced termination confirmation screen, according to the embodiment.

This screen displays a message 1201 for confirming whether or not to forcibly terminate the program. Here, if a YES button 1202 is selected, the processing proceeds to step S713 and the program is forcibly terminated. If the NO button 1203 is selected, the processing terminates without anything being done.

Figure 10:
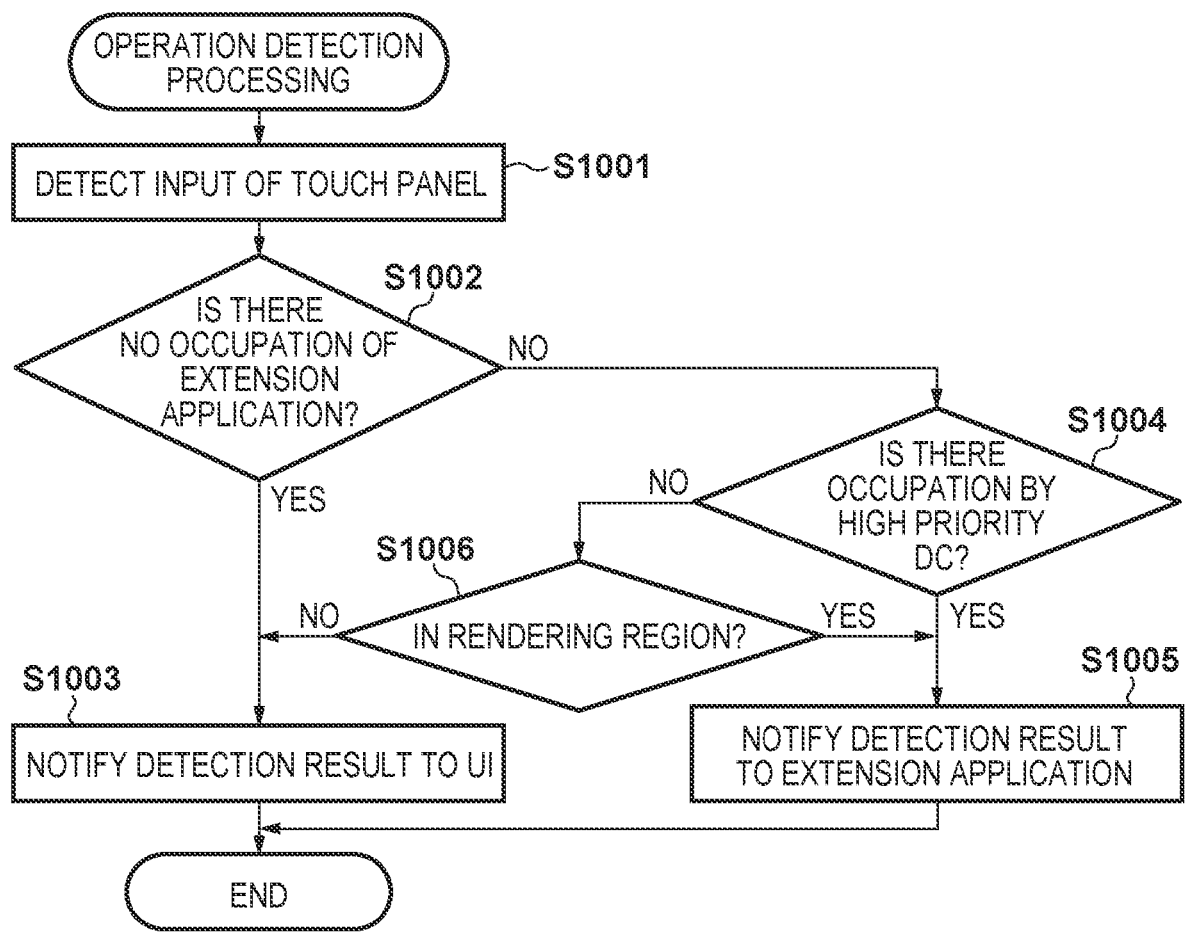
FIG. 10 is a flowchart for describing processing for detecting an operation of an operation unit by a user, in the MFP according to the embodiment.

FIG. 10 is a flowchart for describing processing for detecting an operation of the operation unit 107 by a user, in the MFP 100 according to the embodiment. Because this processing is realized by the CPU 101 executing a program deployed to the RAM 103 by the boot program previously described, an agent of processing is explained here as the CPU 101. The processing is part of processing that configures the UI device control module 211.

In step S1001, the CPU 101 periodically monitors, via the device driver 208 and the operation controller 106, an operation on the operation unit 107 by a user, and detects operation content such as a touch position. Next, the processing proceeds to step S1002, and the CPU 101 determines whether or not a program of the extension application 210 is occupying the screen. Upon determining here that there is no occupation of the screen, the processing proceeds to step S1003. In step S1003, the CPU 101 notifies the detected content that was detected in step S1001 to the UI 202, and this processing terminates.

Meanwhile, when the CPU 101 determines in step S1002 that there is occupation of the screen by the program of the extension application 210, the processing proceeds to step S1004. In step S1004, the CPU 101 determines whether it is in a state where the screen is occupied by the higher priority DC. Upon determining that it is in a state where the screen is occupied by the higher priority DC, the processing proceeds to step S1005. In step S1005, the CPU 101 notifies the detected details to the program of the extension application 210, and this processing terminates.

Meanwhile, in step S1004, when the CPU 101 determines that it is not in a state where the screen is being occupied by the higher priority DC, the processing proceeds to step S1006. In step S1006, the CPU 101 determines whether the operation position is the region 901 of FIG. 9 or the region 902, for example. Here, when the region 901 is determined, in other words, a rendering region in accordance with the program of the extension application 210, the processing proceeds to step S1005, detected details are notified to the program of the extension application 210, and this processing terminates. Meanwhile, when the region 902 is determined, in other words, not within the rendering region in accordance with the program of the extension application 210, the processing proceeds to step S1003, a detection result is notified to the UI 202, and this processing terminates.

As explained above, by virtue of this embodiment, in an MFP that executes jobs under a condition that a user has logged in, even if an abnormality has been occurred by the login program, it is possible to restrict functions that can be executed and display a screen for guiding a user so as to enter a state in which the device, including the login program, operates normally.

Other Embodiments

In the embodiment previously described, description was given for an example in which control is performed so as to prohibit execution of any job in step S706 of FIG. 7. However, conventionally targets for restriction of job execution by login through a login program are only specific users or departments. When all jobs are restricted if an abnormality is occurred in a login program, normally job execution is also restricted for users or departments who are not subject to restriction of job execution.

Accordingly, configuration may be taken such that jobs from users or departments who are not subject to restrictions on job execution can be executed, instead of prohibiting execution of all jobs. An example of this method is described below.

Restriction of job execution is performed by the job control module 203. Identification information for specifying a specific user or department who is subject to job execution restriction is typically added to a job from the user or department. Accordingly, when such identification information is not present or in the case of a job having a predetermined ID that indicates that restriction of job execution is not to be performed, control is performed by the job control module 203 such that execution is possible even if an abnormality is occurred in the login program.

In this manner, a user or department who is normally not subject to restriction of job execution can use the MFP 100 without job execution being restricted, even if an abnormality is occurred in a login program.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225380, filed Nov. 18, 2016, which is hereby incorporated by reference herein in its entirety.

What is claimed is:

1. An image forming apparatus for authenticating a user by a login program that operates on firmware, the apparatus comprising:
   a memory storing a set of instructions; and
   one or more processors that execute instructions of the set of the instructions and cause the image forming apparatus to function as:
      a reception unit configured to receive an operation by a user via an operation unit;
      a restriction unit configured to restrict execution of a job without causing the login program to terminate when an abnormality of the login program is detected; and
      a control unit configured to, while execution of the job is restricted, control to enable reception of an operation for disabling the login program via the reception unit, and, in accordance with the operation for disabling, cause the job that is restricted by the restriction unit to be executed.

2. The image forming apparatus according to claim 1, wherein the operation for disabling the login program is an operation by a user who has an administrator authority that is authenticated by an authentication function that the image forming apparatus has.

3. The image forming apparatus according to claim 1, wherein the operation unit has a display unit, and the restriction unit displays, on the display unit, a screen for prompting reactivation of a power supply of the image forming apparatus.

4. The image forming apparatus according to claim 3, wherein the restriction unit also restricts a screen transition on the display unit while execution of the job is restricted.

5. An image forming apparatus having a reception unit configured to receive an operation by a user, and operable to cause an application program to operate on firmware,
   wherein the firmware detects an abnormality of the application program that operates on the firmware, and, when the application program for which the abnormality was detected is a login program, restricts execution of a job without causing the login program to terminate, and
   while execution of the job is restricted, the firmware enables reception of an operation for disabling the login program via the reception unit, and causes the job to be executed in accordance with the operation for disabling.

6. The image forming apparatus according to claim 5, wherein the operation for disabling the login program is an operation by a user who has an administrator authority that is authenticated by an authentication function held by the image forming apparatus.

7. The image forming apparatus according to claim 5, wherein the operation unit has a display unit, and the firmware displays, on the display unit, a screen for prompting reactivation of a power supply of the image forming apparatus.

8. The image forming apparatus according to claim 7, wherein the firmware also restricts a transition of a screen of the display unit while execution of the job is restricted.

9. The image forming apparatus according to claim 8, wherein the firmware releases the restriction of the transition of the screen of the display unit in accordance with the operation for disabling.

10. The image forming apparatus according to claim 7, wherein the at least one processor executes instructions of the set of the instructions and cause the image forming apparatus to further function as:
    a UI device control unit configured to control display on the display unit in accordance with a rendering request from the firmware or the reception unit,
    wherein the UI device control unit, when there is a rendering request from the reception unit, controls a display on the display unit in accordance with the rendering request from the reception unit if the application program that operates on the firmware is not occupying the screen of the display unit.

11. The image forming apparatus according to claim 10, wherein the UI device control unit, when there is a rendering request from the application program that operates on the firmware, controls a display on the display unit in accordance with the rendering request if an application having a priority lower than that of the application program is not occupying the screen of the display unit.

12. The image forming apparatus according to claim 5, wherein the firmware forcibly stops the application program for which the abnormality was detected if the application program for which the abnormality was detected is not a login program.

13. The image forming apparatus according to claim 5, wherein the abnormality of the application program is detected in accordance with there being no response within a predetermined amount of time to a message sent to the application program in accordance with the firmware generating an event.

14. The image forming apparatus according to claim 5, wherein the login program is implemented in the firmware as one application program.

15. A method of controlling an image forming apparatus for authenticating a user by a login program that operates on firmware, the method comprising:
    receiving an operation by a user via an operation unit;
    restricting execution of a job without causing the login program to terminate when an abnormality of the login program is detected; and
    while execution of the job is restricted, controlling to enable reception of an operation for disabling the login program and causing the job that is restricted to be executed in accordance with the operation for disabling.

16. A non-transitory computer readable storage medium storing a program for causing a computer to execute a method of controlling an image forming apparatus for authenticating a user by a login program that operates on firmware, the method comprising:
    receiving an operation by a user via an operation unit;
    restricting execution of a job without causing the login program to terminate when an abnormality of the login program is detected; and
    while execution of the job is restricted, controlling to enable reception of an operation for disabling the login program and causing the job that is restricted to be executed in accordance with the operation for disabling.

17. An image forming apparatus for authenticating a user by a login program that operates on firmware, the apparatus comprising:
an operation unit;
a memory storing a set of instructions; and
one or more processors that execute instructions of the set of the instructions and cause the image forming apparatus to function as:
a control unit configured to display a screen that restricts receiving an operation to execute a job by a user via the operation unit without causing the login program to terminate when an abnormality of the login program is detected, and permits receiving the operation to execute the job by the user via the operation unit in accordance with having received an operation to disable the login program by the user.

18. The image forming apparatus according to claim 17, wherein the control unit transmits a message to the login program and determines that the abnormality in the execution of the login program has occurred in a case where a response to the message is not received within a predetermined time period after a transmission of the message.

19. The image forming apparatus according to claim 17, wherein the control unit causes a display to display a message for prompting the user to reactivate a power supply of the image forming apparatus in accordance having occurred the abnormality in the execution of the login program.

20. The image forming apparatus according to claim 17, wherein the operation for disabling the login program is an operation by a user who has an administrator authority that is authenticated by the image forming apparatus.

21. The image forming apparatus according to claim 17, wherein the operation unit has a display unit, and the firmware displays, on the display unit, a screen for prompting reactivation of a power supply of the image forming apparatus.

22. The image forming apparatus according to claim 21, wherein the firmware also restricts a transition of a screen of the display unit while execution of a job is restricted.

23. The image forming apparatus according to claim 22, wherein the firmware releases a restriction of the transition of the screen of the display unit in accordance with the operation for disabling.

24. The image forming apparatus according to claim 21, further comprising:
a UI device control unit configured to control display to the display unit in accordance with a rendering request from the firmware or the operation unit,
wherein the UI device control unit, when there is a rendering request from the operation unit, controls a display on the display unit in accordance with the rendering request from the operation unit if the login program that operates on the firmware is not occupying the screen of the display unit.

25. The image forming apparatus according to claim 24, wherein the UI device control unit, when there is a rendering request from an application program that operates on the firmware, controls a display on the display unit in accordance with the rendering request if an application having a priority lower than that of the application program is not occupying the screen of the display unit.

26. The image forming apparatus according to claim 17, wherein the firmware forcibly stops an application program for which the abnormality was detected if the application program for which the abnormality was detected is not a login program.

27. The image forming apparatus according to claim 17, wherein the abnormality of the login program is detected in accordance with there being no response within a predetermined amount of time to a message sent to the login program in accordance with the firmware generating an event.

28. The image forming apparatus according to claim 17, wherein the login program is implemented in the firmware as one application program.

29. A method of controlling an image forming apparatus, having an operation unit, for authenticating a user by a login program that operates on firmware, the method comprising:
displaying a screen that restricts receiving an operation to execute a job by a user via the operation unit without causing the login program to terminate when an abnormality of the login program is detected; and
permitting receiving the operation to execute the job by the user via the operation unit in accordance with having received an operation to disable the login program by the user.

* * * * *